UNITED STATES PATENT OFFICE.

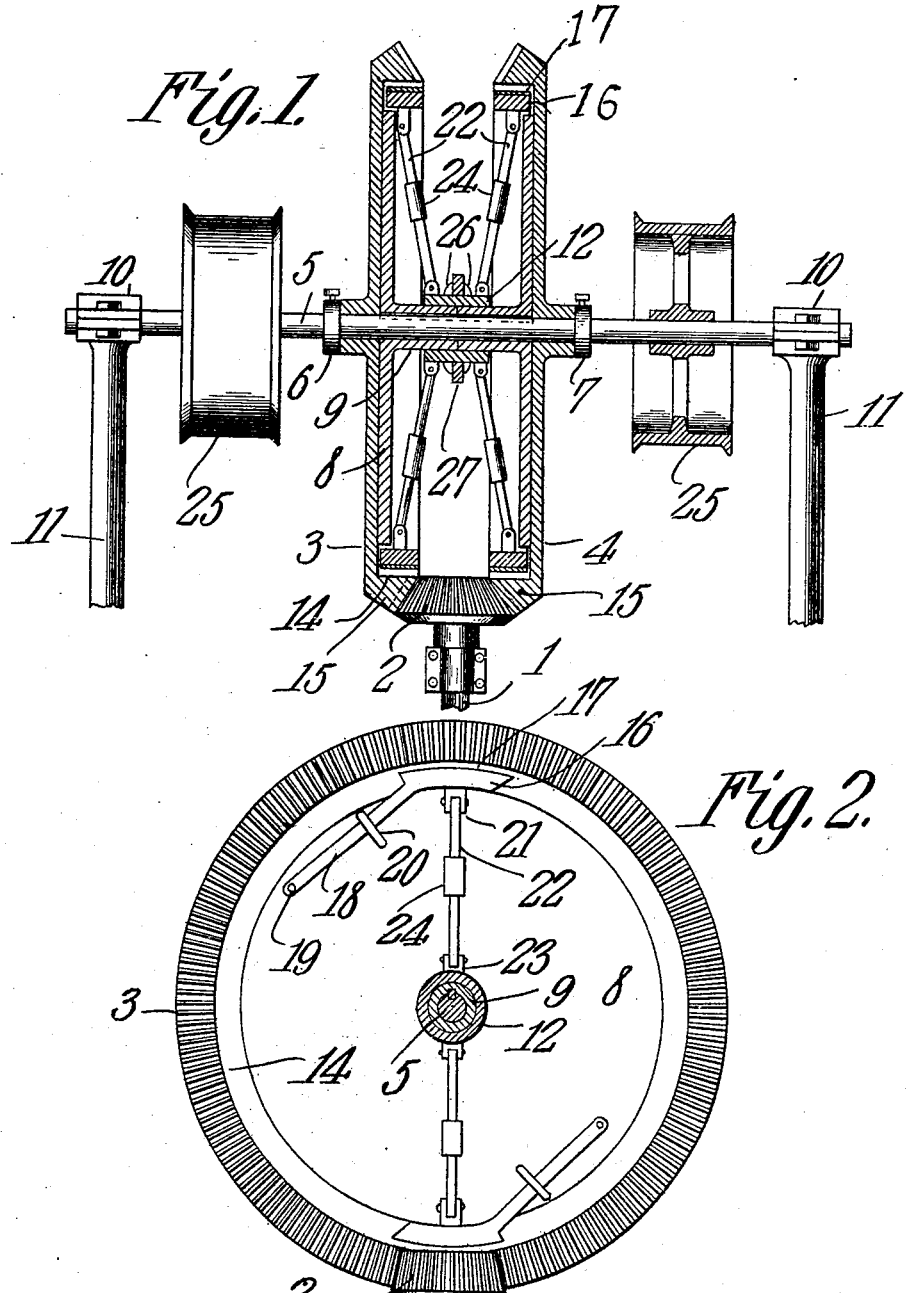

EDWARD L. SMITH, OF BURLINGAME, KANSAS.

REVERSING-GEAR.

No. 914,980.      Specification of Letters Patent.      Patented March 9, 1909.

Application filed January 25, 1908. Serial No. 412,658.

*To all whom it may concern:*

Be it known that I, EDWARD L. SMITH, a citizen of the United States, residing at Burlingame, in the county of Osage and State of Kansas, have invented a new and useful Reversing-Gear, of which the following is a specification.

This invention has reference to improvements in reversing gear, and its object is to provide means whereby power may be applied in reverse directions from a driving member moving always in one direction to driven members movable in opposite directions, and to either one of which the power element is to be coupled at any one time.

In accordance with the present invention there is provided a power shaft upon which is mounted a pinion engaging two gear wheels in such manner that one gear wheel is rotated by the power shaft in one direction and the other gear wheel is rotated by the power shaft in the other direction. These gear wheels are mounted upon a driven shaft but are not directly connected thereto, and, therefore, may rotate idly upon said driven shaft. Adjacent to each gear wheel there is a member secured to the driven shaft, and said members each carry clutch shoes which are connected to a shifting mechanism whereby the clutch shoes of one member may be brought into operative relation with the corresponding gear wheel as the clutch shoes of the other member are moved out of operative relation with its corresponding gear wheel. Upon the driven shaft are secured winding drums or other means for transmitting power. The construction is such that when one gear wheel is clutched to the corresponding clutch member the shaft will be rotated in one direction, and when the other gear wheel is clutched to its corresponding clutch member the shaft will be rotated in the opposite direction.

The invention will be fully understood from the following detailed description, taken in connection with the accompanying drawings forming part of this specification, in which,—

Figure 1 is a central longitudinal section, with parts in elevation, of the improved reversing gear; and Fig. 2 is a central cross section of the same.

Referring to the drawings, there is shown a power shaft 1 which for the purposes of the invention may be considered as coupled to any suitable source of power. This shaft terminates in a bevel pinion 2 engaged at diametrically opposite points by bevel crown gear wheels 3 and 4, each of which is mounted upon a driven shaft 5, to be referred to more particularly hereinafter. Each of these gear wheels is mounted upon the shaft to turn freely about the same, and said gear wheels are prevented from moving in one direction by fixed collars 6 and 7, respectively, or any other suitable means for the purpose may be employed. The two wheels are spaced apart a distance corresponding to the diameter of the bevel pinion 2, and interior to each bevel gear wheel 3 and 4 is a disk 8 mounted upon the shaft 5 and provided with an elongated hub 9 keyed to the shaft so as to rotate therewith. One face of each disk 8 is contiguous to the inner face of the gear wheel 3 or 4, while each hub 9 which projects from the opposite face of the corresponding disk 8 is of sufficient length so that the contiguous ends of the hubs 9 will abut.

The ends of the shaft 5 may be supported in journal bearings 10 which, in turn, may be carried by posts or standards 11, but the particular manner of journaling the ends of the shaft is not material to the present invention.

Mounted on the elongated hubs 9 is a sleeve 12, to which reference will hereinafter be made.

Each of the disks 8 is of less diameter than the internal diameter of the corresponding crown gear wheel 3 or 4 up to an interior annular shoulder 14 of such gear wheel, formed by the overhang 15 constituting the crown. Carried by each disk 8 at its periphery are one or more diametric pairs of clutch shoes 16, but one pair of shoes being shown on each disk although it is to be understood that more than one pair may be used if desired. Each clutch shoe 16 is provided with a suitable facing 17, which may be renewed when worn, and projecting from one end of each clutch shoe is an arm 18, substantially tangential to the disk with the end of the arm remote from the shoe pivoted, as shown at 19, to the face of the corresponding disk 8, and a guide strap 20 serves to confine the clutch shoe to the face of the disk 8 but does not prevent it from being moved for a limited distance about the pivot 19. Each clutch shoe is formed on the side remote from the cluching face 17 with ears 21 between which is pivoted one end of a coupling link 22, the other end of which is pivoted between ears 23 formed on the sleeve 12 before referred to. In order that the length of the link 22 may be adjusted to determine the extent of movement of the clutch shoes 16 to and from the shoulders 14, each link 22 is provided with a turn-buckle 24. By mounting the clutch shoe upon an arm which is pivoted at its other end to the disk substantially tangential thereto the drag of the clutch shoe is borne entirely by the arm and its pivot connection which may be made as strong as desired, and furthermore a disk is well adapted to receive such side strain. Furthermore the toggle links are relieved from all side strains and it is unnecessary to provide guiding means for the clutch shoes or the toggle links supporting them as in other structures where the clutch shoes move radially in guided ways on arms projecting from the hub.

Upon the shaft 5 there are drums or pulleys 25 by means of which power may be transmitted from the shaft to some point of utilization.

In order to move the clutch shoes 16 in a direction to cause their clutching faces to engage the shoulders 14 the sleeve 12 is moved longitudinally upon the hubs 9, and for this purpose there is applied to the sleeve 12 between spaced annular ribs 26 a ring 27 to which may be secured an operating lever in the usual manner. When the sleeve 12 is moved in one direction, say toward the right as viewed in Fig. 1, the links 22 operate after the manner of toggle links and force the corresponding clutch shoes 16 into engagement with the shoulder 14 on the gear wheel 4, while the clutch shoes 16 adjacent to the shoulder 14 on the gear wheel 3 are moved away therefrom. Now, the power shaft is assumed to be constantly rotating in one direction and the gear wheels 3 and 4 are also constantly rotating, but in opposite directions. When the clutch shoes 16 are brought into engagement with the shoulder 14 on the gear wheel 4 motion is imparted to the corresponding disk 8 and through the same to the shaft 5 and the pulleys or drums 25 are thereby rotated. When the sleeve 12 is moved in the opposite direction, that is, toward the left as viewed in Fig. 1, the shaft 5 is coupled up to the gear wheel 3 and the drums or pulleys 25 are hen rotated but in a direction opposite to that in which they were before rotated. The two gear wheels 3 and 4 cannot be simultaneously clutched to the shaft 5.

I claim:—

A reversing gear comprising a shaft, two spaced gear wheels having over-hanging rims and mounted loosely on the shaft in spaced relation one to the other, a pinion engaging both gear wheels, a disk housed in each gear wheel within the over-hanging rim and provided with an elongated hub on one side, the said hubs abutting between and spacing the disks, a sliding sleeve mounted on the abutting hubs, diametrically arranged clutch shoes each carried by an arm substantially tangential and pivoted to the respective disk near the periphery thereof and arranged to engage under the overhanging rim on the respective gear wheel, a guide for each arm for holding it to the disk, connections between the clutch shoes and the sliding sleeve, and means for moving the sleeve longitudinally on the hubs on the disks.

In testimony that I claim the foregoing as my own, I have hereto affixed my signature in the presence of two witnesses.

EDWARD L. SMITH.

Witnesses:
A. B. FARR,
F. W. MINER.